(12) United States Patent
Jiang et al.

(10) Patent No.: US 9,204,139 B2
(45) Date of Patent: Dec. 1, 2015

(54) DISPLAY SYSTEM AND METHOD THEREOF

(75) Inventors: Taiping Jiang, Hunan (CN); Feng Yang, Hunan (CN)

(73) Assignee: Celvision Technologies Limited, Hunan Province (CN)

(*) Notice: Subject to any disclaimer, the term of this patent is extended or adjusted under 35 U.S.C. 154(b) by 379 days.

(21) Appl. No.: 13/994,803

(22) PCT Filed: Dec. 30, 2010

(86) PCT No.: PCT/CN2010/002209
§ 371 (c)(1),
(2), (4) Date: Sep. 3, 2013

(87) PCT Pub. No.: WO2012/079205
PCT Pub. Date: Jun. 21, 2012

(65) Prior Publication Data
US 2014/0009590 A1    Jan. 9, 2014

(30) Foreign Application Priority Data

Dec. 17, 2010 (CN) .......................... 2010 1 0593615

(51) Int. Cl.
| | | |
|---|---|---|
| *H04N 13/04* | (2006.01) | |
| *G02F 1/139* | (2006.01) | |
| *G02B 27/22* | (2006.01) | |

(52) U.S. Cl.
CPC .......... *H04N 13/0456* (2013.01); *G02F 1/1396* (2013.01); *H04N 13/0402* (2013.01); *H04N 13/0409* (2013.01); *H04N 13/0431* (2013.01);
(Continued)

(58) Field of Classification Search
USPC .......................................................... 348/57
See application file for complete search history.

(56) References Cited

U.S. PATENT DOCUMENTS 5,907,436 A * 5/1999 Perry .................. G02B 5/1814
                                                    359/569
6,295,065 B1    9/2001 Tettington
(Continued)

FOREIGN PATENT DOCUMENTS

CN        201063782 Y     5/2008
CN        201425676 Y     3/2010
(Continued)

OTHER PUBLICATIONS

International Search Report for PCT/CN2010/002209.

*Primary Examiner* — Dave Czekaj
*Assistant Examiner* — Leron Beck
(74) *Attorney, Agent, or Firm* — The PL Law Group, PLLC

(57) ABSTRACT

The system includes a control host computer, a switching apparatus, a grating panel and a plane panel. The control host computer transmits the switching signal to the bare eye stereoscopic display status or to the transparent status to the switching apparatus, and according to the former switching signal, the switching apparatus transmits the square wave signal and the bare eye stereoscopic video signal to the grating panel and plane panel respectively, and according to the latter switching signal, the switching apparatus does not transmit the square wave signal to the grating panel, but transmits the 2D video signal to the plane panel. The grating panel forms the slit grating fringe according to the square wave signal and is transparent without the square wave signal. The stereoscopic video information indicated by the bare eye stereoscopic video signal is displayed by the plane panel cooperating with the slit grating fringe.

22 Claims, 2 Drawing Sheets

(52) U.S. Cl.
CPC ....... *H04N 13/0434* (2013.01); *H04N 13/0438* (2013.01); *H04N 13/0452* (2013.01); *G02B 27/2264* (2013.01)

(56) References Cited

U.S. PATENT DOCUMENTS

| | | | | |
|---|---|---|---|---|
| 7,515,340 | B1 * | 4/2009 | Shiu | G02B 26/005 359/462 |
| 8,592,814 | B2 * | 11/2013 | Yamazaki | H01L 27/1225 257/43 |
| 8,637,866 | B2 * | 1/2014 | Isa | H01L 27/1214 257/347 |
| 2001/0031122 | A1 * | 10/2001 | Lackritz | B82Y 30/00 385/131 |
| 2006/0072005 | A1 | 4/2006 | Thomas-Wayne | |
| 2009/0261328 | A1 * | 10/2009 | Miyairi | C23C 16/0272 257/57 |
| 2009/0321743 | A1 * | 12/2009 | Isa | H01L 27/1214 257/66 |
| 2010/0096631 | A1 * | 4/2010 | Miyairi | H01L 27/1214 257/57 |
| 2010/0183037 | A1 * | 7/2010 | Furuya | G02B 6/0008 372/6 |
| 2011/0062433 | A1 * | 3/2011 | Yamazaki | H01L 27/1225 257/43 |

FOREIGN PATENT DOCUMENTS

| CN | 101900884 A | 12/2010 |
|---|---|---|
| CN | 101990106 A | 3/2011 |

* cited by examiner

DISPLAY SYSTEM AND METHOD THEREOF

CROSS REFERENCE TO RELATED APPLICATIONS AND CLAIM OF PRIORITY

This patent application is a National Phase application under 35 U.S.C. §371 of International Application No. PCT/CN2010/002209, filed on Dec. 30, 2010, which claims priority to Chinese Patent Application number 201010593615.1, filed on Dec. 17, 2010, entire contents of which are incorporated herein by reference.

TECHNICAL FIELD

The present invention relates to a display field, in particular, which is related to a display system and the method thereof.

BACKGROUND OF THE INVENTION

A conventional display technology may be used to display a planar image or a planar video, and to display a stereoscopic image or a stereoscopic video too. For example, a liquid crystal display television can display a two-dimensional television program transmitted from a TV station in a wired mode or in a wireless mode, and a cinema can use a 3D technology to display a three-dimensional stereoscopic movie.

However, in the field of the conventional display technology, one set of display device can only support one display mode. For example, a liquid crystal television can only display a two-dimensional television program, but cannot display a three-dimensional stereoscopic movie. In addition, by using the 3D technology, a three-dimensional stereoscopic image can only be displayed, and a planar image cannot be displayed. Therefore, when a plurality of display modes are in demand, a plurality of sets of display devices must be provided at the same time. And thus, the cost to display is undoubtedly too high.

SUMMARY OF THE INVENTION

The technical problem solved by the present invention is to provide a display system and the method thereof with both functions of a planar display and a stereoscopic display.

The technical solution of the present invention to solve the technical problem described above is as follows: A display system, which has a control host, a switching device, a grating panel and a flat panel; the distance between the flat panel and the interior of the grating panel is the first distance, and a viewer is at the exterior of the grating panel, wherein, the control host is used to transmit to the switching device a switching signal, which comprises: a signal switching to a naked eye stereoscopic display status, and the signal switching to a fully transparent status;

the switching device is used to transmit a square wave signal to the grating panel and to transmit a naked eye stereoscopic video signal to the flat panel according to the signal switching to a naked eye stereoscopic display status; and the switching device is used not to transmit a square wave signal to the grating panel but to transmit a planar video signal to the flat panel according to the signal switching to a fully transparent status;

the grating panel is used to generate alternate bright and dark fringes of a slit grating on the grating panel according to the square wave signal, and to be in a transparent status while there is not any square wave signal;

the flat panel, coordinated with the fringes of the slit grating, is used to display stereoscopic video information indicated by the naked eye stereoscopic video signal so as to bring a stereoscopic video perception to the eyes of the viewer; and the flat panel is used to display planar video information indicated by the planar video signal The advantages of the present invention are as follows: because the control host can transmit to the switching device a variety of sorts of switching signals such as a signal switching to a naked eye stereoscopic display status and a signal switching to a fully transparent status, the switching device can transmit to the grating panel a square wave signal according to the signal switching to a naked eye stereoscopic display status so as to allow the grating panel to generate alternate bright and dark fringes of a slit grating on the grating panel according to the square wave signal. The flat panel, together with the fringes of the slit grating, displays the stereoscopic video information indicated by the naked eye stereoscopic video signal transmitted from the switching device in the case where there is the first distance between the flat panel and the interior of the grating panel, so as to bring a stereoscopic video perception to the eyes of the viewer at the exterior of the grating panel. Thus at this moment, the display system is implementing a stereoscopic display. In a further embodiment, the switching device does not transmit to the grating panel a square wave signal according the signal switching to a fully transparent status transmitted from the control host so that the grating panel is in a fully transparent status, and then the flat panel displays planar video information indicated by a planar video signal transmitted from the switching device so as to bring a stereoscopic video perception to the eyes of the viewer. At this moment, the system is implementing a planar display. Therefore, the present invention has both functions of a flat-screen display and a stereoscopic display.

Based on the technical solution described above, the present invention can also be improved as follows:

Further, the grating panel comprises sequentially connected components such as the first polarizer, the first transparent substrate, the first transparent electrode, a twisted nematic liquid crystal layer, the second transparent electrode, the second transparent substrate and the second polarizer; wherein the polarization direction of the first polarizer and the polarization direction of the second polarizer are orthogonal to each other;

the first transparent electrode, coordinated with the second transparent electrode, receives the square wave signal;

there is a slit grating on the first transparent electrode and the liquid crystals in the twisted nematic liquid crystal layer correspond to the portion in the slit grating other than the slits;

the first transparent electrode is used to be such that the liquid crystals in the twisted nematic liquid crystal layer are in an opaque status under the high potential action of the square wave signal, and that the liquid crystals in the twisted nematic liquid crystal layer are in a transparent status under the low potential action of the square wave signal.

In addition, the display system further comprises time-division stereoscopic glasses, which comprise a left-eye lens and a right-eye lens;

the switching signal further comprises a signal switching to a time-division stereoscopic display status;

the switching device is used not to transmit a square wave signal to the grating panel but to transmit a time-division video signal to the flat panel according to the signal switching to a time-division stereoscopic display status in order to transmit a left-eye switching signal to the left-eye lens of the time-division stereoscopic glasses and transmit a right-eye switching signal to the right-eye lens of the time-division 3D glasses respectively and alternately at a frequency of a positive integer number of times of 120 Hz;

the flat panel is used to display time-division video information indicated by the time-division video signal;

the left-eye lens is in a transparent status under the action of the left-eye switching signal so that the viewer's left eye can watch the time-division video information through the left-eye lens; and the left-eye lens is in an opaque status when there is no left-eye switching signal so that the viewer's left eye cannot watch the time-division video information through the left-eye lens;

the right-eye lens is in a transparent status under the action of the right-eye switching signal so that the viewer's right eye can watch the time-division video information through the right-eye lens; and the right-eye lens is in an opaque status when there is no right-eye switching signal so that the viewer's right eye cannot watch the time-division video information through the right-eye lens.

Further, the display system further comprises color separation stereoscopic glasses, which comprise a color separation left-eye lens and a color separation right-eye lens;

the switching signal further comprises a signal switching to a color separation stereoscopic display status;

the switching device is used not to transmit a square wave signal to the grating panel but to transmit a color separation video signal to the flat panel according to the signal switching to a color separation stereoscopic display status;

the flat panel is used to display color separation video information indicated by the color separation video signal;

the color separation left-eye lens of the color separation stereoscopic glasses is used to allow the viewer's left eye to watch the left-eye information in the color separation video information through the color separation left-eye lens itself;

the color separation right-eye lens of the color separation stereoscopic glasses is used to allow the viewer's right eye to watch the right-eye information in the color separation video information through the color separation right-eye lens itself;

wherein, the left-eye information and the right-eye information coordinate with each other so as to bring a stereoscopic video perception to the eyes of the viewer.

Further, the frequency of the square wave signal is 60 Hz or a positive integer number of times of 120 Hz.

Further, the first distance is any distance between 3 mm-10 mm.

Further, the flat panel is a flat LCD panel.

Further, the refresh rate of the flat LCD panel is a positive integer number of times of 120 Hz.

Furthermore, the present invention also provides a display method, the method comprises the steps of:

a grating panel is set so that the viewer is at the exterior of the grating panel; and the distance between the flat panel and the interior of the grating panel is set as the first distance;

the control host transmits to the switching device a switching signal, which comprises a signal switching to a naked eye stereoscopic display status and a signal switching to a fully transparent status;

the switching device judges the sort of the switching signal;

if the switching device judges that the switching signals is the signal switching to a naked eye stereoscopic display status, the switching device transmits a square wave signal to the grating panel and transmits a naked eye stereoscopic video signal to the flat panel; and then the grating panel generates alternate bright and dark fringes of a slit grating on the grating panel according to the square wave signal; the flat panel, coordinated with the fringes of the slit grating, displays the stereoscopic video information indicated by the naked eye stereoscopic video signal so as to bring a stereoscopic video perception to the eyes of the viewer;

if the switching device judges that the switching signal is a signal switching to a fully transparent status, the switching device does not transmit a square wave signal to the grating panel but transmits planar video information to the flat panel; the grating panel is in a transparent status, and the flat panel displays the planar video information indicated by the planar video signal.

In addition, the switching signal further comprises a signal switching to a time-division stereoscopic display status;

if the switching device judges that the switching signal is the signal switching to a time-division stereoscopic display status, the switching device does not transmit a square wave signal to the grating panel but transmits a time-division video signal to the flat panel; and the switching device transmits a left-eye switching signal to the left-eye lens of the time-division stereoscopic glasses and transmits a right-eye switching signal to the right-eye lens of the time-division stereoscopic glasses respectively and alternately at a frequency of a positive integer number of times of 120 Hz;

the flat panel displays time-division video information indicated by the time-division video signal;

during the working cycle of the left-eye switching signal, the left-eye lens is in a transparent status so that the viewer's left eye could watch the time-division video information through the left-eye lens; at the same time, the right-eye lens is in an opaque status so that the viewer's right eye cannot watch the time-division video information through the right-eye lens;

during the working cycle of the right-eye switching signal, the right-eye lens is in a transparent status so that the viewer's right eye could watch the time-division video information through the right-eye lens; at the same time, the left-eye lens is in an opaque status so that the viewer's left eye cannot watch the time-division video information through the left-eye lens.

In addition, the switching signal further comprises a signal switching to a color separation stereoscopic display status;

if the switching device judges that the switching signal is the signal switching to a color separation stereoscopic display status, the switching device does not transmit a square wave signal to the grating panel but transmits a color separation video signal to the flat panel;

the flat panel displays color separation video information indicated by the color separation video signal;

the color separation left-eye lens of the color separation stereoscopic glasses is used to allow the viewer's left eye to watch the left-eye information in the color separation video information through the color separation left-eye lens itself; and the color separation right-eye lens of the color separation stereoscopic glasses is used to allow the viewer's right eye to watch the right-eye information in the color separation video information through the color separation right-eye lens itself;

wherein, the left-eye information and the right-eye information coordinate with each other so as to bring a stereoscopic video perception to the eyes of the viewer.

Further, the frequency of the square wave signal is 60 Hz or a positive integer number of times of 120 Hz.

Further, the first distance is any distance between 3 mm-10 mm.

DETAILED DESCRIPTION OF A PREFERRED EMBODIMENTS

Hereinafter, the principles and features of the present invention will be described with reference to the accompanying drawings. The given embodiments are only intended to illustrate the present invention, but not intended to limit the scope of the present invention.

Figure 1:
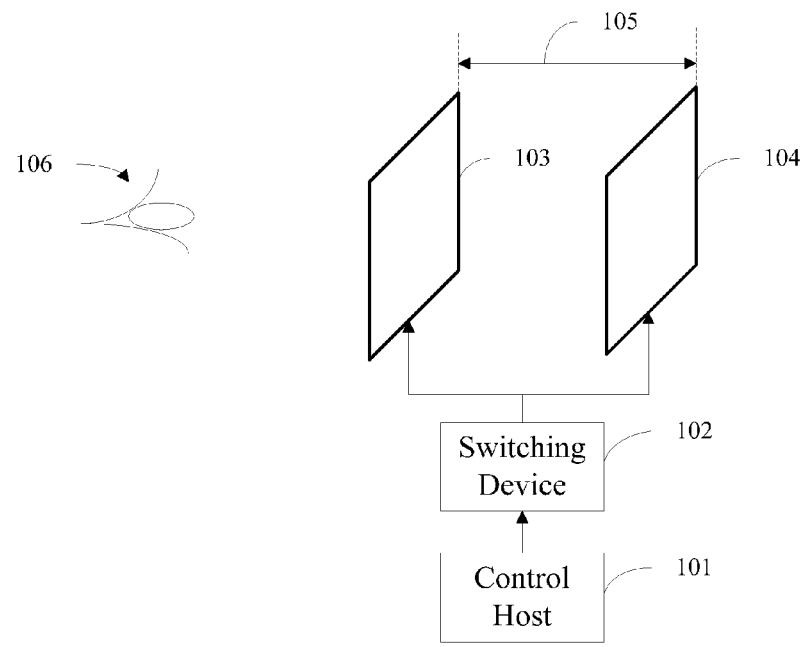
FIG. 1 is a block diagram of a display system provided by the present invention.

FIG. 1 is a block diagram of a display system provided by the present invention. As shown in FIG. 1, the system comprises a control host 101, a switching device 102, a grating panel 103 and a flat panel 104. The distance between the flat panel 104 and the interior of the grating panel 103 is called the first distance 105, and the exterior of the grating panel 103 is the side where the viewer is, wherein, The control host 101 is used to transmit a switching signal to the switching device 102, wherein the switching signal comprises: a signal switching to a naked eye stereoscopic display status, and a signal switching to a fully transparent status;

The switching device 102 is used to transmit a square wave signal to the grating panel 103 and to transmit a naked eye stereoscopic video signal to the flat panel 104 according to the signal switching to a naked eye stereoscopic display status. And the switching device 102 is used not to transmit a square wave signal to the grating panel 103 but to transmit a planar video signal to the flat panel 104 according to the signal switching to a fully transparent status;

The grating panel 103 is used to generate alternate bright and dark fringes of a slit grating on the grating panel according to the square wave signal, and is used to be in a transparent status while there is not any square wave signal;

The flat panel 104, coordinated with the fringes of the slit grating, is used to display the stereoscopic video information indicated by a naked eye stereoscopic video signal so as to bring a stereoscopic video perception to the eyes 106 of the viewer; and is used to display the planar video information indicated by a planar video signal.

Here, the control host 101 is a controlling center, by which a variety of switching signals are transmitted to the switching device 102 so as to control switching between different display modes of the system. For example, if the switching signal is the signal switching to a naked eye stereoscopic display status, it means that it is necessary for the display system to switch from the current operating display mode to the naked eye stereoscopic display status, therefore the viewer can directly watch a stereoscopic video or a stereoscopic image with his/her naked eyes. Similarly, if the switching signal is the signal switching to a fully transparent status, it means that it is necessary for the display system to switch from the current operating display mode to the planar display status, therefore the viewer can directly watch a planar video or a planar image with his/her naked eyes.

The control host 101 can make a decision of transmitting the switching signal after receiving a control signal input from the exterior or the interior of the system, wherein the control signal can be input into the control host 101 by an external remote control, a keyboard or other means. No matter by which manner the control signal is input into the control host 101, as long as the control host 101 can transmit the switching signal, all are within the protection scope of the present invention.

The switching device 102 is a device which receives the switching signal transmitted from the control host 101 and which operates according to the switching signal.

Specifically, if the switching signal is a signal switching to a naked eye stereoscopic display status, the switching device 102 transmits a square wave signal to the grating panel 103, and transmits a naked eye stereoscopic video signal to the flat panel 104, and then the grating panel 103 generate alternate bright and dark fringes of a slit grating according to the square wave signal, and the flat panel 104 can display the stereoscopic video information indicated by the naked eye stereoscopic video signal. Because there is a first distance 105 between the flat panel 104 and the interior of the grating panel 103, a stereoscopic video perception is given to the eyes of the viewer at the exterior of the grating panel 103 by the action of the fringes of the slit grating. Thereby the system can achieve a stereoscopic display effect. Therefore, the stereoscopic display principle of the system is a slit grating stereoscopic display principle. And the stereoscopic display is a naked eye stereoscopic display. Without wearing any dedicated 3D glasses, the viewer can watch a stereoscopic image or a stereoscopic video. Similarly, if the switching signal is a signal switching to a fully transparent status, then according to the switching signal the switching device 102 does not transmit any square wave signal to the grating panel 103, and only transmits planar video information to the flat panel 104. Therefore, the grating panel 103 is in a transparent status while no square wave signal is input to the grating panel 103, and the flat panel 104 displays planar video information indicated by the planar video signal. Therefore, the eyes of viewer, who is at the exterior of the grating panel 103, can watch a planar image or a planar video. At this moment, the system is in a planar display status.

Here, the stereoscopic video information indicated by the naked eye stereoscopic video signal can be an image or a video in a specified format. With the help of the slit grating, the viewer can stereoscopically perceive the image or the video by his/her naked eyes from multiple angles.

The planar video information is general two-dimensional planar video information, such as a 2D image, a 2D video, etc.

In the display system, the switching device 102 may transmit a square wave signal to the grating panel 103 in a wired mode; moreover, the switching device 102 may naturally transmit a square wave signal to the grating panel 103 in a wireless mode either in case of appropriate conditions. The switching device 102 transmits the naked eye stereoscopic video signal, the planar video signal and other possible video signals to the flat panel 104 by means of a dedicated cable, for example, by means of commonly used cables such as VGA, DVI and HDMI.

In the present invention, the frequency of the square wave signal transmitted by the switching device 102 is 60 Hz or a positive integer number of times of 120 Hz.

In the present invention, the first distance 105 may be any distance between 3 mm-10 mm.

In the present invention, the flat panel 104 can be a flat liquid crystal display (LCD) panel, the refresh rate of the flat LCD panel is a positive integer number of times of 120 Hz.

In the present invention, the control host 101 transmits the switching signal to the switching device 102 in variety of ways, such as transmits the switching signal to the switching device 102 by a USB interface, or by a serial interface, a parallel interface and a variety of wireless interfaces.

Thus, in the present invention, the control host 101 can transmit to the switching device 102 a variety of switching signals, which comprise the signal switching to a naked eye stereoscopic display status and the signal switching to a fully transparent status. For example, if the switching signal is the signal switching to a naked eye stereoscopic display status, the switching device 102 transmits a square wave signal to the grating panel 103 according to the signal switching to a naked eye stereoscopic display status, and then the grating panel 103 generates alternate bright and dark fringes of a slit grating according to the square wave signal. In the case that there is the first distance 105 between the flat panel 104 and the interior of the grating panel 103. The flat panel 104, coordinated with the fringes of the slit grating, displays the stereoscopic video information indicated by the naked eye stereoscopic video signal transmitted by the switching device 102 so as to bring a stereoscopic video perception to the eyes of the viewer at the exterior of the grating panel 103. At this moment, the system is implementing a stereoscopic display. Similarly, if the switching signal is the signal switching to a fully transparent status, the switching device 102, the switching device 102 does not transmit a square wave signal to the grating panel 103 according to the switching to a fully transparent status transmitted by the control host 101. And then, the grating panel 103 is in a transparent status, and the flat panel 104 displays the planar video information indicated by the planar video signal transmitted by the switching device 102 so as to make the eyes of the viewer to watch planar video information. At this moment, the system is implementing a planar display. Accordingly, the present invention has both a planar display function and a stereoscopic display function.

In the display system, as long as the grating panel 103 generates alternate bright and dark fringes of a slit grating according to the square wave signal, and as long as the grating panel 103 is in a transparent status when there is no square wave signal, all kinds of structures of the grating panel 103 fall within the protection scope of the present invention.

Figure 2:
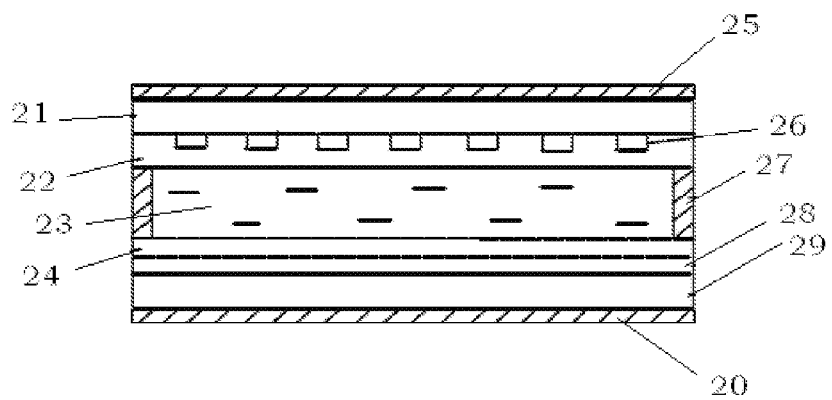
FIG. 2 is a block diagram of a preferred embodiment of a grating panel in the present invention.

FIG. 2 is a block diagram of a preferred embodiment of the grating panel of the present invention. As shown in FIG. 2, the grating panel comprises sequentially connected components such as the first polarizer 25, the first transparent substrate 21, the first transparent electrode 26, a twisted nematic liquid crystal layer 23, the second transparent electrode 28, the second transparent substrate 29 and the second polarizer 20; wherein:

The polarization direction of the first polarizer 25 and the polarization direction of the second polarizer 20 are orthogonal to each other;

The first transparent electrode 26, coordinated with the second transparent electrode 28, receives a square wave signal;

There is a slit grating on the first transparent electrode 26 and the liquid crystals in the twisted nematic liquid crystal layer 23 corresponds to a portion in the slit grating other than the slits.

The first transparent electrode 26 is used to be such that the liquid crystal in the twisted nematic liquid crystal layer 23 is in the opaque status under the high potential action of the square wave signal, and that the liquid crystal in the twisted nematic liquid crystal layer 23 is in a transparent status under the low potential action of the square wave signal.

Here, the grating panel comprises sequentially connected components such as the first polarizer 25, the first transparent substrate 21, the first transparent electrode 26, a twisted nematic liquid crystal layer 23, the second transparent electrode 28, the second transparent substrate 29 and the second polarizer 20. Therefore, there are some contact surfaces between adjacent components, and the adjacent components can be connected by means of printing, attaching or plating such as electric plating. For example, the first polarizer 25 and the first transparent substrate 21 can be connected by means of attaching or printing; and the second polarizer 20 and the second transparent substrate 29 can be connected by means of attaching or printing too. The first transparent electrode 26 is plated on a side of the first transparent substrate 21 close to the twisted nematic liquid crystal layer 23; and the second transparent electrode 28 is plated on a side of the second transparent substrate 29 close to the twisted nematic liquid crystal layer 23.

The polarization direction of the first polarizer 25 and the polarization direction of the second polarizer 20 are orthogonal to each other; therefore, a variety of videos or images displayed on the flat panel can pass through the first polarizer 25 and the second polarizer 20, whose polarization directions are orthogonal to each other, and finally arrive at the eyes of the viewer at the exterior of the grating panel, due to the optical rotation action of the liquid crystal molecules in the twisted nematic liquid crystal layer 23, in the case where the first transparent substrate 21, the first transparent electrode 26, the second transparent electrode 28 and the second transparent substrate 29, which are between the first polarizer 25 and the second polarizer 20, are transparent. Thus, if the display system is implementing a planar display, the planar video information displayed on the flat panel can pass through the grating panel without any impediment, and finally arrive at the viewer's eyes. Moreover, if the display system is implementing a stereoscopic display, the stereoscopic video information displayed on the flat panel can also pass through the slits of the fringes of the slit grating formed by the grating panel, and finally arrive at the eyes of the viewer at the exterior of the grating panel.

The first transparent electrode 26, coordinated with the second transparent electrode 28, receives a square wave signal. Therefore, the first transparent electrode 26 and the second transparent electrode 28 are two receiving terminals of the square wave signal transmitted from the switching device, and the potential difference between the first transparent electrode 26 and the second transparent electrode 28 are used as the square wave signal received by the grating panel. And thus the potential difference can be applied to the liquid crystal in the twisted nematic liquid crystal layer 23 such that the liquid crystal in a transparent status or in an opaque status. Thus, alternate bright and dark fringes of the slit grating are generated.

There is a slit grating on the first transparent electrode 26. Therefore, there are a number of slits on the first transparent electrode 26 so as to generate a pattern of the slit grating on the first transparent electrode 26. Then in the pattern, the parameters such as the inclination angle of the slits, the distance between adjacent slits, the proportion of the slit width and the distance between adjacent slits all meet the requirements of a naked eye stereoscopic display. With regard to the production process of the slit grating on the first transparent electrode 26, pre-made films, on which there is an eligible grating pattern meeting the requirements, are used as the mask plate. And the first transparent electrode 26, on which there is an eligible grating pattern meeting the requirements, is produced by means of existing photolithography techniques such as the contact exposure method.

In the grating panel of the present invention, the second transparent electrode 28 can completely cover the second transparent substrate 29.

Because the first transparent electrode 26 and the twisted nematic liquid crystal layer 23 have a contacting interface, the liquid crystal in the twisted nematic liquid crystal layer 23 corresponds to a portion in the slit grating other than the slits. Therefore, viewing in the direction perpendicular to the contacting interface of both the twisted nematic liquid crystal layer 23 and the portion in the slit grating other than the slits, there is no liquid crystal at a location on the twisted nematic liquid crystal layer 23 corresponding to the location of the slits of the first transparent electrode 26, and there are some liquid crystals at a location corresponding to the location of a portion on the first transparent electrode 26 other than the slits. Thus, with regard to the whole grating panel, the location on the twisted nematic liquid crystal layer 23 corresponding to the location of the slits of the first transparent electrode 26 is fully transparent; and it is controlled by the square wave signal received by the first transparent electrode 26 and the second transparent electrode 28 that whether the location corresponding to the location of the portion on the first transparent electrode 26 other than the slits is transparent or not. That is, when the first transparent electrode 26 is at a high potential, the location corresponding to the location of the portion on the first transparent electrode 26 other than the slits is in an opaque status; and when the first transparent electrode 26 is at a low potential, the location corresponding to the location of the portion on the first transparent electrode 26 other than the slits is in a transparent status. Then the purpose of generating an alternative light and dark slit grating by a square wave signal is achieved.

The principle that a square wave signal controls the liquid crystal to be transparent or not, is as follows: when the first transparent electrode 26 is at a higher potential relative to the second transparent electrode 28 under the action of a square wave signal, the liquid crystal molecules that contacts the portion on the first transparent electrode 26 other than the slits would lose their optical rotation effects due to the action of the electric field. And thus, the light of an image or a video that arrives at the above said locations of the liquid crystal molecules cannot pass through the first polarizer 25 and the second polarizer 20 whose polarization directions are orthogonal to each other. Hereby, dark fringes are generated at the location on the first transparent electrode 26 other than the slits. However, the location of the slits on the first transparent electrode 26 still keeps in a transparent status because there is no electric field and the liquid crystals are not affected by any electric field. Thus, the lights of an image or a video can pass through the first polarizer 25 and the second polarizer 20 so as to arrive at the viewer's eyes. Therefore, bright fringes are generated at the location of the slits on the first transparent electrode 26. As a result, alternate bright and dark fringes of a slit grating are generated on the grating panel.

As shown in FIG. 2, there could further be a component 22 between the first transparent electrode 26 and the twisted nematic liquid crystal layer 23, and there could further be a component 24 between the second transparent electrode 28 and the twisted nematic liquid crystal layer 23. Both of the above two components are transparent materials, and can ensure that the potential difference between the first transparent electrode 26 and the second transparent electrode 28 can act on the liquid crystals in the twisted nematic liquid crystal layer 23 so that the liquid crystals could satisfy the functions of the above said grating panel.

As shown in FIG. 2, in order to prevent liquid crystals in the twisted nematic liquid crystal layer 23 from overflowing, a packaging operation should be done at the periphery of the twisted nematic liquid crystal layer 23, and the packaging material 27 can be a mixed material of an epoxy resin and a polyamide resin.

In the grating panel of the present invention, the first transparent substrate 21 can be a glass substrate, or a transparent plastic substrate; and the second transparent substrate 29 can be a glass substrate, or a transparent plastic substrate. The material of the first transparent electrode 26 may be indium tin oxide semiconductor (ITO), and the material of the second transparent electrode 28 may be ITO too.

The display system provided by the present invention can further comprise time-division stereoscopic glasses, which comprise a left-eye lens and a right-eye lens; the switching signal transmitted from the control host 101 in FIG. 1 further comprises a signal switching to a time-division stereoscopic display status; and thus, The switching device 102 can be used not to transmit a square wave signal to the grating panel 103 but to transmit a time-division video signal to the flat panel 104 according to the signal switching to a time-division stereoscopic display status. And the switching device 102 transmits a left-eye switching signal to the left-eye lens of the time-division stereoscopic glasses and transmits a right-eye switching signal to the right-eye lens of the time-division stereoscopic glasses respectively and alternately at a frequency of a positive integer number of times of 120 Hz.

The flat panel 104 is used to display a time-division video information indicated by a time-division video signal;

The left-eye lens is in a transparent status under the action of a left-eye switching signal so that the viewer's left eye is allowed to watch the time-division video information through the left-eye lens. And the left-eye lens is in an opaque status while there is not any left-eye switching signal so that the viewer's left eye is not allowed to watch the time-division video information through the left-eye lens;

The right-eye lens is in a transparent status under the action of a right-eye switching signal so that the viewer's right eye is allowed to watch the time-division video information through the right-eye lens. And the right-eye lens is in an opaque status while there is not any right-eye switching signal so that the viewer's right eye is not allowed to watch the time-division video information through the right-eye lens.

Here, the switching signal is the signal switching to a time-division stereoscopic status signal. Therefore, the display system needs to switch its display status to a time-division stereoscopic display status. At this moment, the viewer, who is at the exterior of the grating panel 103, is required to wear the time-division stereoscopic glasses, and the grating panel 103 is required to keep in a transparent status so that the time-division video information displayed on the flat panel 104 can pass through the grating panel 103 without any impediment, and pass through the left-eye lens and the right-eye lens of the time-division stereoscopic glasses alternately, and then go into viewer's left eye and right eye alternately so as to bring a stereoscopic video perception to the eyes of the viewer.

The time-division stereoscopic glasses allow viewer's left eye and right eye to watch the time-division video information respectively and alternatively through the left-eye lens and the right-eye lens so as to switch the left-eye lens and the right-eye lens alternately at a high frequency to a transparent status and an opaque status. And thus a stereoscopic video perception is given to the eyes of the viewer.

Wherein, the switching frequency is a frequency of an integer number of times of 120 Hz. The switching frequency relates to a refresh frequency of the time-division stereoscopic glasses. The time-division stereoscopic glasses sold on the market typically require the refresh frequency of each lens of the time-division stereoscopic glasses to be not less than 60 Hz. Therefore, when the two lenses are alternately switched to the transparent status, the switching frequency of the whole time-division stereoscopic glasses is not less than 120 Hz. Of course, the switching frequency of the time-division stereoscopic glasses provided by the present invention can also be a frequency of integer number of timess of 120 Hz such as 240 Hz, 360 Hz, etc.

The switching device 102 can transmit a time-division video signal to the flat panel 104 by means of commonly used cables such as VGA, DVI and HDMI.

A left-eye switching signal is transmitted to the left-eye lens of the time-division stereoscopic glasses and a right-eye switching signal is transmitted to the right-eye lens of the time-division stereoscopic glasses respectively and alternately in a wireless mode. It may naturally be in a wired mode either in case of appropriate conditions.

In the display system, a left-eye switching signal and a right-eye switching signal are transmitted to the left-eye lens of the time-division stereoscopic glasses and to the right-eye lens of the time-division stereoscopic glasses respectively and alternately. Therefore, a left-eye switching signal is only transmitted to the left-eye lens, and a right-eye switching signal is only transmitted to the right-eye lens. When the left-eye switching signal is applied to the left eye, no right-eye switching signal is applied to the right-eye lens. And when the right-eye switching signal is applied to the right eye, no left-eye switching signal is applied to the left-eye lens. And then it can be ensured that when the left-eye lens is in a transparent status, the right-eye lens is in an opaque status, and that when the right-eye lens is in a transparent status, the left-eye lens is in an opaque status.

Here, the time-division video information indicated by the time-division video signal varies with a transparent status and an opaque status of the left-eye lens and the right-eye lens. That is, when the left-eye lens is in a transparent status and the right-eye lens is in an opaque status, the time-division video information is a right-eye image or a right-eye video suitable to be watched by the viewer's left eye through the left-eye lens. And when the right-eye lens is in a transparent status and the left-eye lens is in an opaque status, the time-division video information is a right-eye image or a right-eye video suitable to be watched by the viewer's right eye through the right-eye lens.

The display system of the present invention can further comprise color separation stereoscopic glasses, which comprise a color separation left-eye lens and a color separation right-eye lens.

The switching signal further comprises a signal switching to a color separation stereoscopic display status;

The switching device 102 is used not to transmit a square wave signal to the grating panel 103 but to transmit a color separation video signal to the flat panel 104 according to the signal switching to a color separation stereoscopic display status;

The flat panel 104 is used to display the color separation video information indicated by the color separation video signal;

The color separation left-eye lens of the color separation stereoscopic glasses is used to allow the viewer's left eye to watch the left-eye information in the color separation video information through the color separation left-eye lens itself;

The color separation right-eye lens of the color separation stereoscopic glasses is used to allow the viewer's right eye to watch the right-eye information in the color separation video information through the color separation right-eye lens itself;

Wherein, the left-eye information and the right-eye information coordinate with each other so as to bring a stereoscopic video perception to the eyes of the viewer.

Here, the switching signal is a signal switching to a color separation stereoscopic display status. Therefore, the display system needs to switch its display status to a color separation stereoscopic display status. At this moment, the viewer, who is at the exterior of the grating panel 103, is required to wear color separation stereoscopic glasses and the grating panel 103 is required to be in a transparent status so as to ensure that the color separation video information displayed on the flat panel 104 can pass through the grating panel 103 without any impediment. Wherein, left-eye information is watched by the viewer's left eye through the color separation left-eye lens. And right-eye information is watched by the viewer's right eye through the color separation right-eye lens. The left-eye information and the right-eye information coordinate with each other so as to bring a stereoscopic video perception to the eyes of the viewer.

The color separation stereoscopic glasses bring a stereoscopic video perception to the eyes of the viewer by means of distinguishing the left-eye information and the right-eye information in the color separation video information displayed on the flat panel 104 and transmitting the left-eye information and the right-eye information into the left eye and the right eye of the viewer respectively so as to bring a stereoscopic video perception to the eyes of the viewer. The switching device 102 can transmit a color separation video signal to the flat panel 104 by means of commonly used cables such as VGA, DVI and HDMI.

The color separation video information can be an image or a video. Based on the three primary color theory, all the color separation video information is consisted of red information, blue information and green information. Thereby, as a preferred embodiment of the invention, when the left-eye information mentioned above is red information, the right-eye information is green information and blue information. As a further preferred embodiment of the invention, when the left-eye information is green information and blue information, the right-eye information is red information.

In the present invention, because a set of display system can switch its display mode so as to implement a plurality of display modes such as the naked eye stereoscopic display mode, the planar display mode, the color separation stereoscopic display mode, and the time-division stereoscopic display mode, thereby the present invention can greatly reduce the display cost for the plurality of display modes and facilitate the popularity of the display system.

In addition, the flat panel in the prior art can only display a planar video. However, the flat panel in the present invention can display in a plurality of display modes such as the planar display mode, the color separation stereoscopic display mode, and the time-division stereoscopic display mode. The flat panel in the present invention has both functions of a planar display and a stereoscopic display. Therefore, the present invention not only takes full advantage of a flat panel resource such as a LCD and improves the price-performance ratio of such products, but also provides a variety of free stereoscopic display experiences to the customers according to different requirements of the customers.

Figure 3:
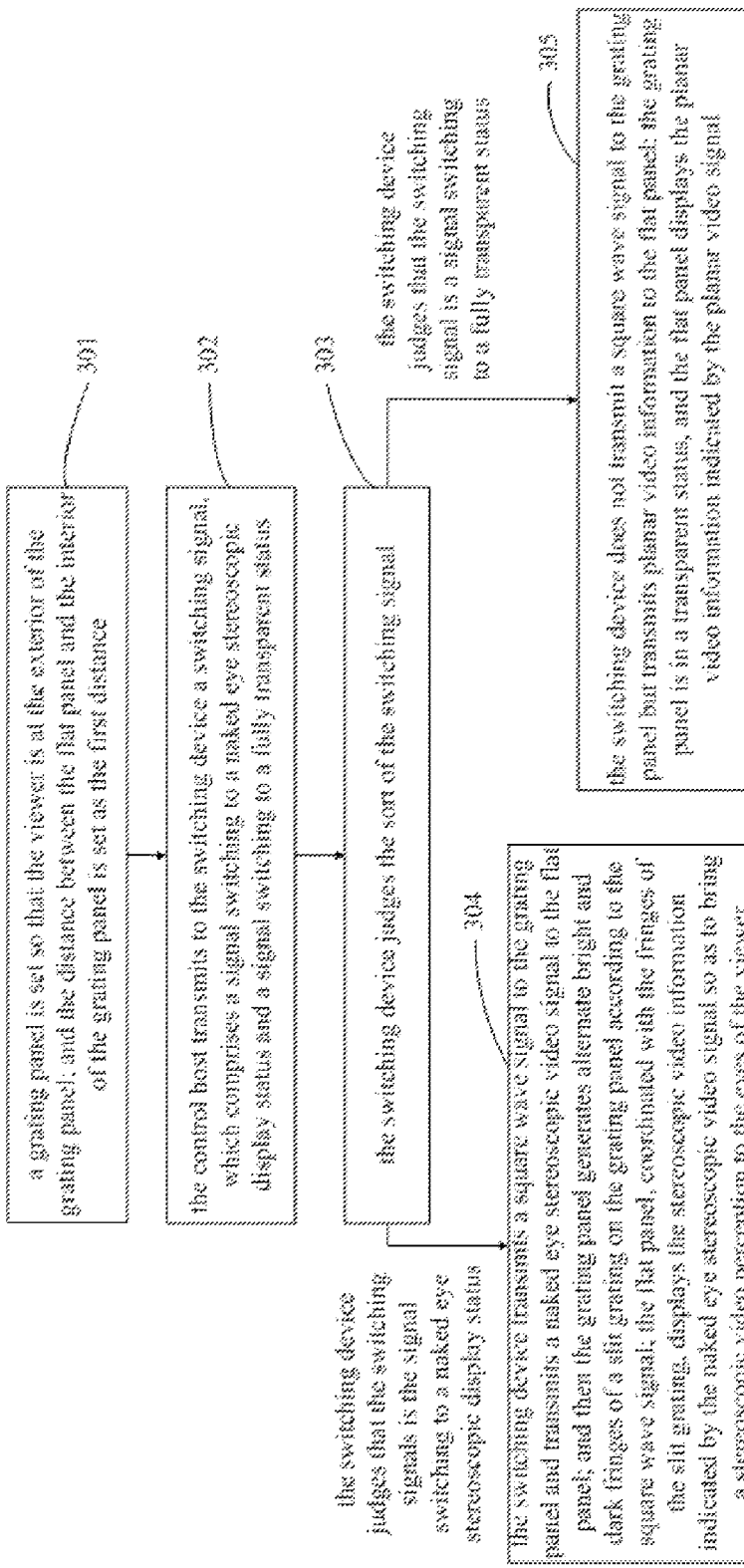
FIG. 3 is a flow chart of a display method provided by the present invention.

FIG. 3 is a flow chart of the display method provided by the present invention. As shown in FIG. 3, the method comprising the following steps:

Step 301: the grating panel is set so that the viewer is at the exterior of the grating panel; the distance between the flat panel and the interior of the grating panel is set as the first distance 105.

Here, the viewer is set at the exterior of the grating panel so as to let the viewer directly face the exterior of the grating panel. If the grating panel is in a transparent status, the viewer watches the planar or stereoscopic video information displayed on the flat panel. If the grating panel generates alternate bright and dark fringes of a slit grating according to a square wave signal transmitted by a switching device, the viewer can watch the stereoscopic video information displayed on the flat panel with his/her naked eyes because the distance between the flat panel and the interior of the grating panel is set as the first distance 105. The first distance 105 can be any distance between 3 mm-10 mm.

Step 302: a control host transmits to the switching device a switching signal, which comprises: a signal switching to a naked eye stereoscopic display status, and a signal switching to a fully transparent status.

Here, the switching signal transmitted to the switching device by the control host is used to allow the switching device to make a switching decision according to the switching signal and to transmit an appropriate signal to the grating panel, the flat panel, the time-division stereoscopic glasses or the color separation stereoscopic glasses so as to switch to a wanted display mode indicated by the switching signal.

The switching signal comprises a variety of sorts of signals, wherein, a signal switching to a naked eye stereoscopic display status is used to allow the display status to switch to a naked eye stereoscopic display mode, that is, the viewer can watch a stereoscopic video information displayed on the flat panel by using his/her naked eyes so as to generate a stereoscopic video perception; a signal switching to a fully transparent status is used to allow the display status to switch to a planar display status, that is, the viewer can watch planar video information displayed on the flat panel by using his/her naked eyes. Thus, the display method has both display functions of a planar display and a stereoscopic display by switching between the above said display statuses.

Of course, the switching signal further comprises signals other than the above two signals such as a signal switching to a time-division stereoscopic display status and a signal switching to a color separation stereoscopic display status, which are respectively used to make the viewer to watch corresponding stereoscopic video information by corresponding glasses and generate a stereoscopic perception.

Step 303: the switching device judges the sort of the switching signal.

Here in the step 303, if the switching device judges that the switching signal is the signal switching to a naked eye stereoscopic display status, then go to perform the step 304; if the switching device judges that the switching signal is the signal switching to a fully transparent status then go to perform the step 305.

Step 304: the switching device transmits a square wave signal to the grating panel and transmits a naked eye stereoscopic video signal to the flat panel; and then the grating panel generates alternate bright and dark fringes of a slit grating on the grating panel according to the square wave signal. The flat panel, coordinated with the fringes of the slit grating, displays stereoscopic video information indicated by the naked eye stereoscopic video signal so as to bring a stereoscopic video perception to the eyes of the viewer.

Here in step 303, the switching device judges that the switching signal is the signal switching to a naked eye stereoscopic display status. Therefore, the switching device transmits the square wave signal to the grating panel according to the switching signal and transmits a naked eye stereoscopic video signal to the flat panel. Thus, the viewer at the exterior of the grating panel can watch the stereoscopic video information displayed by the flat panel with his/her naked eyes, and a stereoscopic video perception is given to the eyes of the viewer.

The square wave signal is used to make the grating panel to generate alternate bright and dark fringes of a slit grating. And thus, with the help of the fringes of the slit grating, the viewer can watch the stereoscopic video information by his/her naked eyes and have a stereoscopic video perception.

The principle that the grating panel generates alternate bright and dark fringes of a slit grating according to the square wave signal is as follows: there are liquid crystals controlled by the potential of a transparent electrode, there is a pattern of the slit grating on the transparent electrode, and there is a piece of polarizer respectively on each of two sides of a joint body of the transparent electrode and the liquid crystals. And the polarization directions of the two pieces of polarizers are orthogonal to each other. And thus, when the square wave signal has been transmitted into the transparent electrode, the high potential of the transparent electrode allows the liquid crystals in contact with the transparent electrode to lose their optical rotation effects under the action of an electric field. Therefore, the lights of an image or a video that arrives at the locations of the liquid crystal molecules cannot pass through the two pieces of polarizers whose polarization directions are orthogonal to each other. Because there is a pattern of the slit grating on the transparent electrode; viewing in the direction toward the grating panel from the viewer's position, dark fringes are generated at the location on the transparent electrode other than the slits. Moreover, because there is no electric field at the slits and lights can pass through the slits, bright fringes are generated at the location of the slits. Thus, alternate bright and dark fringes of a slit grating are generated on the grating panel by the high potential of the transparent electrode. When the transparent electrodes are at a low potential under the action of the square wave signal, because there is no electric field, the liquid crystal molecules have their optical rotation effects. And thus, lights can pass through the two pieces of polarizers, the transparent electrodes and the liquid crystals, and directly go into the viewer's eyes. Therefore, the high or low potential of the square wave signal allow the slit grating to generate fringes of the slit grating which appears and disappears periodically. The fringes of the slit grating can just allow the stereoscopic video information watched by the naked eyes of the viewers to bring a stereoscopic video perception to the viewers. Here, the parameters, such as the inclination angle of the slits, the distance between adjacent slits, and the proportion of the slit width and the distance between adjacent slits all meet the requirements of a naked eye stereoscopic display.

The frequency of the square wave signal is 60 Hz or a positive integer number of times of 120 Hz Step 305: the switching device does not transmit a square wave signal to the grating panel but transmits a planar video signal to the flat panel; the grating panel is in a transparent status, and the flat panel displays the planar video information indicated by the planar video signal.

Here in step 303, the switching device judges that the switching signal is the signal switching to a fully transparent status, thereby, the switching device do not transmit the square wave signal to the grating panel so that the grating panel is in a fully transparent status; that is, the planar video information displayed on the flat panel can pass through the grating panel and arrive at the eyes of the viewer at the exterior of the grating panel so as to allow the viewer to watch the planar video information displayed on the flat panel by his/her naked eyes.

In this method, the switching signal transmitted from the control host to the switching device further comprises a signal switching to a time-division stereoscopic display status; thus, In Step 303, if the switching device judges that the switching signal is the signal switching to a time-division stereoscopic display status, the switching device does not transmit a square wave signal to the grating panel but transmits a time-division video signal to the flat panel; and the switching device transmits a left-eye switching signal to the left-eye lens of the time-division stereoscopic glasses and transmits a right-eye switching signal to the right-eye lens of the time-division stereoscopic glasses respectively and alternately at a frequency of a positive integer number of times of 120 Hz.

The flat panel displays time-division video information indicated by a time-division video signal.

During the working cycle of the left-eye switching signal, the left-eye lens is in a transparent status so that the viewer's left eye is allowed to watch the time-division video information through the left-eye lens; at the same time, the right-eye lens is in an opaque status so that the viewer's right eye is not allowed to watch the time-division video information through the right-eye lens;

During the working cycle of the right-eye switching signal, the right-eye lens is in a transparent status so that the viewer's right eye is allowed to watch the time-division video information through the right-eye lens; at the same time, the left-eye lens is in an opaque status so that the viewer's left eye is not allowed to watch the time-division video information through the left-eye lens;

Thus, in this method, the left-eye lens is in a transparent status or in an opaque status respectively so as to control whether the left eye of the viewer is allowed to watch the time-division video information through the left-eye lens or not; the right-eye lens is in a transparent status or in an opaque status respectively to control whether the right eye of the viewer is allowed to watch the time-division video information through the right-eye lens or not;

If the switching signal is the signal switching to a time-division stereoscopic display status, the switching device makes a corresponding switch decision to switch the display status to a time-division stereoscopic display status, that is, to switch the time-division video information watched by the left eye and the right eye of the viewer alternately in a high frequency so as to allow the time-division video information watched by the viewer to bring a stereoscopic video perception to the viewer.

In this method, the switching signal transmitted from the control host to the switching device further comprises a signal switching to a color separation stereoscopic display status; thus, In Step 303, if the switching device judges that the switching signal is the signal switching to a color separation stereoscopic display status, the switching device does not transmit a square wave signal to the grating panel but transmits a color separation stereoscopic video signal to the flat panel;

The flat panel displays color separation video information indicated by a color separation video signal.

The color separation left-eye lens of the color separation stereoscopic glasses allows the viewer's left eye to watch the left-eye information in the color separation video through the left-eye lens itself; and the color separation right-eye lens of the color separation stereoscopic glasses allows the viewer's right eye to watch the right-eye information in the color separation video through the right-eye lens itself; wherein: the left-eye information and the right-eye information coordinate with each other so as to bring a stereoscopic video perception to the eyes of the viewer.

Thus in this method, the left eye and the right eye of the viewer are allowed to watch the left-eye information and the right-eye information respectively under the action of the color separation effect of the color separation stereoscopic glasses. Therefore, the left-eye information and the right-eye information coordinate with each other so as to bring a stereoscopic video perception to the eyes of the viewer.

Based on the three primary color theory, the left-eye information can be red information, while the right-eye information is green information and blue information. In addition, the left-eye information can be green information and blue information, while the right-eye information is red information.

Thus As can be seen, the present invention has the following advantages:

In the present invention: because the control host can transmit to the switching device a variety of sorts of switching signals such as a signal switching to a naked eye stereoscopic display status and a signal switching to a fully transparent status, the switching device can transmit to the grating panel a square wave signal according to the signal switching to a naked eye stereoscopic display status so as to allow the grating panel to generate alternate bright and dark fringes of a slit grating on the grating panel according to the square wave signal. The flat panel, coordinated with the fringes of the slit grating, displays the stereoscopic video information indicated by the naked eye stereoscopic video signal transmitted from the switching device in the case where there is the first distance between the flat panel and the interior of the grating panel, so as to bring a stereoscopic video perception to the eyes of the viewer at the exterior of the grating panel. Thus at this moment, the display system is implementing a stereoscopic display. In a further embodiment, the switching device does not transmit to the grating panel a square wave signal according the signal switching to a fully transparent status transmitted from the control host so that the grating panel is in a fully transparent status, and then the flat panel displays the planar video information indicated by the planar video signal transmitted from the switching device so as to bring a stereoscopic video perception to the eyes of the viewer. At this moment, the system is implementing a planar display. Therefore, the present invention has both functions of a flat-screen display and a stereoscopic display.

(2) In the present invention, the present invention can greatly reduce the cost in case of requiring a variety of sorts of display modes, and also facilitate the popularity of the display system because one set of the display system can achieve a variety of sorts of display modes such as a naked eye stereoscopic display, a planar display, a color separation stereoscopic display and a time-division stereoscopic display.

(3) In the conventional display technology, the flat panel can only display a planar video. However, the flat panel in the present invention can implement a variety of sorts of display modes such as a planar display, a color separation stereoscopic display and a time-division stereoscopic display. The flat panel has both functions of a planar display and a stereoscopic display. Therefore, the present invention cannot only take full advantage of a flat panel resource such as a LCD and improve the cost of such products, but also achieve a variety of free stereoscopic display experiences according to different requirements of the customers.

The preferred embodiments described above are only to exemplify the present invention but not to limit the scope of the present invention. Any equivalent modification, variation or improvement according to the spirit and the principle of the present invention is to be included within the scope of the present invention.

What is claimed is:

1. A display system, characterized in that the display system comprises a control host, a switching device, a grating panel and a flat panel, the distance between the flat panel and the interior of the grating panel is the first distance, and a viewer is at the exterior of the grating panel, wherein, the control host is used to transmit to the switching device a switching signal, which comprises: a signal switching to a naked eye stereoscopic display status, and a signal switching to a fully transparent status;

the switching device is used to transmit a square wave signal to the grating panel and to transmit a naked eye stereoscopic video signal to the flat panel according to the signal switching to a naked eye stereoscopic display status, and the switching device is used not to transmit a square wave signal to the grating panel but to transmit a planar video signal to the flat panel according to the signal switching to a fully transparent status;

the grating panel is used to generate alternate bright and dark fringes of a slit grating on the grating panel according to the square wave signal, and the grating panel is in a transparent status while there is not any square wave signal; and the flat panel, coordinated with the fringes of the slit grating, is used to display stereoscopic video information indicated by the naked eye stereoscopic video signal so as to bring a stereoscopic video perception to the eyes of the viewer, and the flat panel is used to display planar video information indicated by the planar video signal.

2. The display system according to claim 1, characterized in that the grating panel comprises sequentially connected components such as the first polarizer, the first transparent substrate, the first transparent electrode, a twisted nematic liquid crystal layer, the second transparent electrode, the second transparent substrate and the second polarizer, wherein the polarization direction of the first polarizer and the polarization direction of the second polarizer are orthogonal to each other;

the first transparent electrode, coordinated with the second transparent electrode, receives the square wave signal;

there is a slit grating on the first transparent electrode and the liquid crystals in the twisted nematic liquid crystal layer correspond to the portion in the slit grating other than the slits; and the first transparent electrode is used to be such that the liquid crystals in the twisted nematic liquid crystal layer are in an opaque status under the high potential action of the square wave signal, and that the liquid crystals in the twisted nematic liquid crystal layer are in a transparent status under the low potential action of the square wave signal.

3. The display system according to claim 1 or claim 2, characterized in that the display system further comprises time-division stereoscopic glasses, which comprise a left-eye lens and a right-eye lens;

the switching signal further comprises a signal switching to a time-division stereoscopic display status;

the switching device is used not to transmit a square wave signal to the grating panel but to transmit a time-division video signal to the flat panel according to the signal switching to a time-division stereoscopic display status in order to transmit a left-eye switching signal to the left-eye lens of the time-division stereoscopic glasses and transmit a right-eye switching signal to the right-eye lens of the time-division 3D glasses respectively and alternately at a frequency of a positive integer number of times of 120 Hz;

the flat panel is used to display time-division video information indicated by the time-division video signal;

the left-eye lens is in a transparent status under the action of the left-eye switching signal so that the viewer's left eye can watch the time-division video information through the left-eye lens, and the left-eye lens is in an opaque status when there is no left-eye switching signal so that the viewer's left eye cannot watch the time-division video information through the left-eye lens; and the right-eye lens is in a transparent status under the action of the right-eye switching signal so that the viewer's right eye can watch the time-division video information through the right-eye lens, and the right-eye lens is in an opaque status when there is no right-eye switching signal so that the viewer's right eye cannot watch the time-division video information through the right-eye lens.

4. The display system according to claim 1 or claim 2, characterized in that the display system further comprises color separation stereoscopic glasses, which comprise a color separation left-eye lens and a color separation right-eye lens;

the switching signal further comprises a signal switching to a color separation stereoscopic display status;

the switching device is used not to transmit a square wave signal to the grating panel but to transmit a color separation video signal to the flat panel according to the signal switching to a color separation stereoscopic display status;

the flat panel is used to display color separation video information indicated by the color separation video signal;

the color separation left-eye lens of the color separation stereoscopic glasses is used to allow the viewer's left eye to watch the left-eye information in the color separation video information through the color separation left-eye lens itself; and the color separation right-eye lens of the color separation stereoscopic glasses is used to allow the viewer's right eye to watch the right-eye information in the color separation video information through the color separation right-eye lens itself; and wherein, the left-eye information and the right-eye information coordinate with each other so as to bring a stereoscopic video perception to the eyes of the viewer.

5. The display system according to claim 1 or claim 2, characterized in that the frequency of the square wave signal is 60 Hz or a positive integer number of times of 120 Hz.

6. The display system according to claim 1 or claim 2, characterized in that the first distance is any distance between 3 mm-10 mm.

7. The display system according to claim 1 or claim 2, characterized in that the flat panel is a flat LCD panel.

8. The display system according to claim 7, characterized in that the refresh rate of the flat LCD panel is a positive integer number of times of 120 Hz.

9. A display method, characterized in the display method comprises the steps of:

a grating panel is set so that the viewer is at the exterior of the grating panel; and the distance between the flat panel and the interior of the grating panel is set as the first distance;

the control host transmits to the switching device a switching signal, which comprises a signal switching to a naked eye stereoscopic display status and a signal switching to a fully transparent status;

the switching device judges the sort of the switching signal;

if the switching device judges that the switching signals is the signal switching to a naked eye stereoscopic display status, the switching device transmits a square wave signal to the grating panel and transmits a naked eye stereoscopic video signal to the flat panel, and then the grating panel generates alternate bright and dark fringes of a slit grating on the grating panel according to the square wave signal, the flat panel, coordinated with the fringes of the slit grating, displays the stereoscopic video information indicated by the naked eye stereoscopic video signal so as to bring a stereoscopic video perception to the eyes of the viewer; and if the switching device judges that the switching signal is a signal switching to a fully transparent status, the switching device does not transmit a square wave signal to the grating panel but transmits planar video information to the flat panel, the grating panel is in a transparent status, and the flat panel displays the planar video information indicated by the planar video signal.

10. The display method according to claim 9, characterized in that the switching signal further comprises a signal switching to a time-division stereoscopic display status;

if the switching device judges that the switching signal is the signal switching to a time-division stereoscopic display status, the switching device does not transmit a square wave signal to the grating panel but transmits a time-division video signal to the flat panel, and the switching device transmits a left-eye switching signal to the left-eye lens of the time-division stereoscopic glasses and transmits a right-eye switching signal to the right-eye lens of the time-division stereoscopic glasses respectively and alternately at a frequency of a positive integer number of times of 120 Hz;

the flat panel displays time-division video information indicated by the time-division video signal;

during the working cycle of the left-eye switching signal, the left-eye lens is in a transparent status so that the viewer's left eye could watch the time-division video information through the left-eye lens, at the same time, the right-eye lens is in an opaque status so that the viewer's right eye cannot watch the time-division video information through the right-eye lens; and during the working cycle of the right-eye switching signal, the right-eye lens is in a transparent status so that the viewer's right eye could watch the time-division video information through the right-eye lens, at the same time, the left-eye lens is in an opaque status so that the viewer's left eye cannot watch the time-division video information through the left-eye lens.

11. The display method according to claim 9, characterized in that the switching signal further comprises a signal switching to a color separation stereoscopic display status;

if the switching device judges that the switching signal is the signal switching to a color separation stereoscopic display status, the switching device does not transmit a square wave signal to the grating panel but transmits a color separation video signal to the flat panel;

the flat panel displays color separation video information indicated by the color separation video signal; and the color separation left-eye lens of the color separation stereoscopic glasses is used to allow the viewer's left eye to watch the left-eye information in the color separation video information through the color separation left-eye lens itself, and the color separation right-eye lens of the color separation stereoscopic glasses is used to allow the viewer's right eye to watch the right-eye information in the color separation video information through the color separation right-eye lens itself, wherein, the left-eye information and the right-eye information coordinate with each other so as to bring a stereoscopic video perception to the eyes of the viewer.

12. The display method according to claim 9, 10 or 11, characterized in that the frequency of the square wave signal is 60 Hz or a positive integer number of times of 120 Hz.

13. The display method according to claim 9, 10 or 11, characterized in that the first distance is any distance between 3 mm-10 mm.

14. The display system according to claim 2, characterized in that the display system further comprises time-division stereoscopic glasses, which comprise a left-eye lens and a right-eye lens;

the switching signal further comprises a signal switching to a time-division stereoscopic display status;

the switching device is used not to transmit a square wave signal to the grating panel but to transmit a time-division video signal to the flat panel according to the signal switching to a time-division stereoscopic display status in order to transmit a left-eye switching signal to the left-eye lens of the time-division stereoscopic glasses and transmit a right-eye switching signal to the right-eye lens of the time-division 3D glasses respectively and alternately at a frequency of a positive integer number of times of 120 Hz;

the flat panel is used to display time-division video information indicated by the time-division video signal;

the left-eye lens is in a transparent status under the action of the left-eye switching signal so that the viewer's left eye can watch the time-division video information through the left-eye lens, and the left-eye lens is in an opaque status when there is no left-eye switching signal so that the viewer's left eye cannot watch the time-division video information through the left-eye lens; and the right-eye lens is in a transparent status under the action of the right-eye switching signal so that the viewer's right eye can watch the time-division video information through the right-eye lens, and the right-eye lens is in an opaque status when there is no right-eye switching signal so that the viewer's right eye cannot watch the time-division video information through the right-eye lens.

15. The display system according to claim 2, characterized in that the display system further comprises color separation stereoscopic glasses, which comprise a color separation left-eye lens and a color separation right-eye lens;

the switching signal further comprises a signal switching to a color separation stereoscopic display status;

the switching device is used not to transmit a square wave signal to the grating panel but to transmit a color separation video signal to the flat panel according to the signal switching to a color separation stereoscopic display status;

the flat panel is used to display color separation video information indicated by the color separation video signal;

the color separation left-eye lens of the color separation stereoscopic glasses is used to allow the viewer's left eye to watch the left-eye information in the color separation video information through the color separation left-eye lens itself; and the color separation right-eye lens of the color separation stereoscopic glasses is used to allow the viewer's right eye to watch the right-eye information in the color separation video information through the color separation right-eye lens itself; and wherein, the left-eye information and the right-eye information coordinate with each other so as to bring a stereoscopic video perception to the eyes of the viewer.

16. The display system according to claim 2, characterized in that the frequency of the square wave signal is 60 Hz or a positive integer number of times of 120 Hz.

17. The display system according to claim 2, characterized in that the first distance is any distance between 3 mm-10 mm.

18. The display system according to claim 2, characterized in that the flat panel is a flat LCD panel.

19. The display method according to claim 10, characterized in that the frequency of the square wave signal is 60 Hz or a positive integer number of times of 120 Hz.

20. The display method according to claim 11, characterized in that the frequency of the square wave signal is 60 Hz or a positive integer number of times of 120 Hz.

21. The display method according to claim 10, characterized in that the first distance is any distance between 3 mm-10 mm.

22. The display method according to claim 11, characterized in that the first distance is any distance between 3 mm-10 mm.

\* \* \* \* \*